United States Patent [19]

Tsukane

[11] Patent Number: 4,596,740
[45] Date of Patent: Jun. 24, 1986

[54] RECORDING CARRIER COMPRISING A MAGNETOOPTIC RECORDING MEDIUM LAYER CONSISTING OF RARE EARTH-TRANSITION METAL AMORPHOUS LAYER FORMED ON A PLASTIC SUBSTRATE

[75] Inventor: Nagayoshi Tsukane, Himeji, Japan

[73] Assignee: Daicel Chemical Industries, Ltd., Osaka, Japan

[21] Appl. No.: 657,864

[22] Filed: Oct. 5, 1984

[30] Foreign Application Priority Data

Oct. 5, 1983 [JP] Japan .................................. 58-185094

[51] Int. Cl.⁴ ............................................. G11B 7/24
[52] U.S. Cl. ..................................... 428/336; 360/131; 428/694; 428/900
[58] Field of Search ............... 428/692, 694, 900, 336; 365/122; 360/131, 135

[56] References Cited

U.S. PATENT DOCUMENTS 4,334,233  6/1982  Murakami ........................ 346/135.1
4,467,383  8/1984  Ohta et al. ........................... 360/131

OTHER PUBLICATIONS

Imamura; "Research Applies Magnetic Thin Films and the Magneto-Optic Effect in Storage Devices"; J. Elec. Eng., Mar. '83, p. 100.
Nomura; "Recent Trends in Magneto-Optic Disk" Technocrat, vol. 16, No. 3, Mar. '83, p. 9.
Treves; "Optimum Disk Structures and Energetics of Domain Formation in Magneto-Optic Recording"; IEEE Trans. of Mag. 18, Nov. 82, p. 1241.
Bartolini; "Optical Disk Systems Emerge" IEEE Spectrum, Aug. 1978, p. 20.

Primary Examiner—George F. Lesmes
Assistant Examiner—William M. Atkinson
Attorney, Agent, or Firm—Armstrong, Nikaido, Marmelstein & Kubovcik

[57] ABSTRACT

The present invention relates to a magnetooptic recording medium for recording and reproducing information using laser beams and is a magnetooptic recording carrier which forms on a plastic substrate, a polymer layer having a good bondability with the plastic substrate and forming a rare earth-transition metal amorphous layer on the polymer layer.

4 Claims, 1 Drawing Figure

RECORDING CARRIER COMPRISING A MAGNETOOPTIC RECORDING MEDIUM LAYER CONSISTING OF RARE EARTH-TRANSITION METAL AMORPHOUS LAYER FORMED ON A PLASTIC SUBSTRATE

BACKGROUND OF THE INVENTION

This invention concerns a magnetooptic recording medium for recording and reproducing information using laser beams and, more specifically, as it relates to a magnetooptic recording medium comprising an amorphous layer of rare earth-transition metal formed on a plastic substrate for use in E-DRAW recording material capable of erasing and re-recording, that is, repeating recording.

There has been known a magnetooptic recording method in which a rare earth-transition metal amorphous layer is formed on a substrate, for example, by means of vacuum deposition, sputtering or ion plating, and information is written and erased through the thermomagnetic effect by irradiating laser beams to the amorphous layer and reading the information through the magneto-optical effect. As the substrate for the amorphous layer, while there have been proposed glass plates, metal plates such as of aluminum or plastic plates such as of acrylic resin and polycarbonate resin, prior study has mainly directed to the formation of the amorphous layer on the glass plate. Although it is possible in the case of the glass substrate to form a vertically magnetizable amorphous layer thereon, a technique of forming a vertically magnetizable amorphous layer on the plastic substrate in a stable state has not yet been established at present. Specifically, a Kerr rotational angle of greater than 0.3 degree can be obtained in the case of the glass substrate. However, in the case of the plastic substrate, Kerr rotational angle only of about 0.1 degree can be obtained. While the angle may be increased to more than 0.2 degree in an exceptional case, it lacks in the long time stability and has poor reproducibility. In view of the above, it has been highly demanded to establish a technique for forming a vertically magnetizable amorphous layer stably on a plastic substrate easy to handle with instead of the glass or aluminum substrate employed in the prior art.

It has been considered that the vertical magnetization characteristic of the rare earth-transition metal amorphous layer is dependent on the distortion in the amorphous layer (refer to H. Takagi, et al., *J. Appl. Physics* 50 (3), pp. 1642–1644). Accordingly, the surface property of the substrate on which the amorphous layer is formed constitutes a significant factor. Although it is not apparent at present why the rare earth-transition metal amorphous layer capable of vertical magnetization can be formed on the glass plate but not stably on the plastic plate, the present inventors have considered that the reason is basically attributable to the following two factors.

(1) Acrylic or polycarbonate resins employed as the plastic substrate generally have lower surface energy as compared with that of the glass substrate and thus poor bondability with the rare earth-transition metal amorphous layer and, as the result, it is difficult to produce distortion in the amorphous layer.

(2) Oxygen, moisture, monomer and the like remain in the plastic plate and they deteriorate the rare earth-transition metal amorphous layer to impair the vertical magnetization characteristic thereof.

In view of the above, a method of forming a moisture-proof inorganic protection layer, for example, made of $SiO_2$ and $CaF_2$ has been proposed in order to solve the problem (2) (refer to, for instance, Japanese Patent Laid-Open Nos. 27451/1982 and 32238/1983). However, the problem (1) cannot be solved by such provision of the protection layer. That is, no rare earth-transition metal amorphous layer having stable vertical magnetization characteristic can be formed on plastic substrates.

Accordingly, the object of this invention is to provide a process for forming a rare earth-transition metal amorphous layer on a plastic substrate.

SUMMARY OF THE INVENTION

The feature of this invention resides in forming, on a plastic substrate, a polymer layer having a good bondability with the plastic substrate and forming a rare earth-transition metal amorphous layer on the polymer layer.

The polymer having a good bondability with the plastic substrate usable in this invention may include any organic and inorganic polymers, crosslinkable polymer both of room temperature curing type and heat curing type being particularly preferred. The crosslinkable polymers may include various material, for instance, polyallyl compound, polyfunctional acrylic compound, usual thermosetting resin, alkylsilicate hydrolyzate and organopolysiloxane, so long as they are polmers having a good bondability with the plastic substrate.

The polymers described above may be formed on the plastic substrate usually by a wet process such as post curing of the prepolymer, coating of the polymer solution in a solvent or the like, or they may be formed by a dry process such as deposition method using ion plating technique, provided that a uniform polymer layer can be formed on the plastic substrate. In the case of the wet process, any of the known means such as spin coating, roll coating, bar coating and dipping may be used. The thickness of the polymer layer may be selected such that a uniform gas barrier layer in close contact with the plastic substrate can be formed and it is generally between 0.01 and $10\mu$ and preferably, between 0.1 and $5\mu$.

The magnetooptic recording medium to which this invention is applicable may be any of known rare earth-transition metal amorphous alloys including, for example, Tb-Fe alloy (Japanese Pat. Publication No. 20619/1982), Dy-Fe alloy (Japanese Pat. Publication No. 20692/1982), Gd-Tb-Fe alloy (Japanese Pat. Laid-Open No. 126907/1981), Gd-Tb-Dy-Fe alloy (Japanese Pat. Laid-Open No. 94948/1982), Gd-Co (Japanese Pat. Laid-Open No. 121719/1979) and Tb-Fe-Co or the like. Preferably, the rare earth-transition metal amorphous layer is formed on the polymer layer in this invention by means of sputtering, ion, plating or the like. The thickness of the amorphous layer is generally between 500–1500 Å.

In addition to the intermediate polymer layer according to this invention, other known intermediate layer and/or protection layer can additionally be formed. Specifically, it is also possible to form the layer of dielectric material such as of SiO and $SiO_2$ on the earth earth-transition metal amorphous layer to improve the S/N ratio and use it also as a protection layer (for example, refer to Japanese Pat. Laid-Open Nos. 74843/1981, 156943/1981), or further to form additionally a reflection film such as made of Au and Ag to improve the S/N ratio (for instance refer to Japanese Pat. Laid-Open Nos. 84744/1981, 12428/1982).

The magnetooptic recording medium carrier prepared in accordance with this invention can be applied for the the reflection type recording/reproducing system utilizing the Kerr effect and the transmission type recording/reproducing system utilizing the Faraday effect. For the details of these systems, reference can be made to "Introduction to Video Disc and DAD", pp. 108–150, edited by Soichi Iwamura, published from *Kabushiki Kaisha Corona*, Nov. 1, 1982.

The plastic substrate usable in this invention may be in any desired configuration such as disc, card as well as film, tape or belt.

Any transparent synthetic resin may be used as the material for the plastic substrate including, for instance, acrylic resin, polycarbonate resin and polyester resin such as PET. These resins can be molded by any molding process, for example, injection molding, compression molding, photopolymerization or the like. The plastic substrate may optionally be formed on the surface thereof with track guide grooves or like other signal grooves.

BRIEF DESCRIPTION OF THE DRAWING

The appended drawing shows a conceptional cross-sectional view showing a layered structure of the magnetooptic recoding carrier having the polymer layer according to this invention.

DETAILED DESCRIPTION OF THE INVENTION

Figure 1:
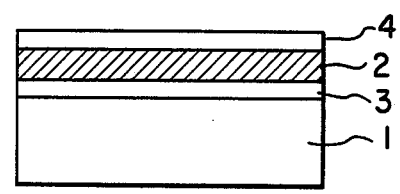
FIG. 1 is a conceptional diagram showing the basic structure of the magnetooptic recording carrier according to this invention, in which are shown a transparent plastic substrate 1 made of acrylic resin, polycarbonate resin or the like, an amorphous recording medium layer 2 made of rare earth-transition metal such as TbFe, GdTbFe and GdTbDyFe, a polymer layer 3 according to this invention, a protection layer and/or sensitization layer 4 consituted with dielectric material and/or reflective material.

Any material may be used for the polymer layer 3 in this invention so long as it has a good bondability with the plastic substrate as described above and the following material can be mentioned as examples.

(1) Polyallyl monomer: for example, diethylene glycol bisallyl carbonate, triallyl cyanurate, diallyloxyalkyl maleate;

(2) Polyfunctional acrylic monomer: for example, ethylene glycol di(metha)acrylate; di-, tri- or polyethylene glycol di(metha)acrylate; alkane diol di(metha)acrylate; oligoester di(metha)acrylate; allyl- or vinyl-methacrylate; (metha)acrylic acid; glycidyl methacrylate; and (metha)acrylic amide;

(3) Thermosetting resin: for example, unsaturated polyester, melamine and polyurethane;

(4) Hydrolyzate of alkyl silicate: for example, hydrolyzate of ethyl silicate; and (5) Organopolysiloxane: for example, silicone oxide, tetrachrolosilane; methyl- or phenyl-trialkoxysilane.

The polymer layer 3 according to this invention ensures the vertical magnetization characteristic of the rare earth-transition metal amorphous recording medium layer 2, as well as it also serves to protect the recording medium 2 against oxygen, moisture and/or monomer intruding from the plastic substrate.

In order to protect the amorphous medium layer 2 against external oxygen and/or moisture, a protection layer 4 is formed to the outer side of the recording medium layer 2. While the protection layer can be made from the same material as that for the polymer layer 3, other polymers than above can also be used, for example, epoxy resin, polyester resin, diallyl phthalate resin, vinylidene resin and synthetic rubber. Inorganic moisture proof film such as made of SiO and CaFs$_2$ can be used as well. In addition to the protection layer 4, a reflection layer (not shown) can further be disposed in order to improve the S/N ratio. The reflection layer is constituted with metal such as Al, Ag, Au, Cu, Zn and Sn and this layer may be disposed either to the inside or the outside of the protection layer 4. By the provision of the reflection layer, the Kerr rotational angle and the S/N ratio can be increased by about several times while depending on the film thickness of the dielectric protection layer.

Examples of the polymer layer according to this invention will now be explained. In each of the examples except Example 3, plastic substrates is prepared by injection molding (using "DINAMELTER" trade name, manufactured by Meiki Seisakusho) of acrylic resin (MFR2) and the amorphous recording medium is formed by way of sputtering (using a sputtering device manufactured by Nippon Shinku Gijutsu K.K.).

EXAMPLE 1

'Thermosetting Resin—Polyurethane Resin'

2 mol of ε-caprolactone and 1 mol of hydroxylethyl methacrylate were reacted to prepare a polymer (FM-2). A mixture of 31.9% by weight of FM-2 and 68.1% by weight of a mixed acrylic monomer consisting of methyl methacrylate, butyl acrylate and methacryl amide was incorporated with a curing agent of the following structure (Duranate 24A-100, trade name, manufactured by Asahi Kasei Industrial Co.):

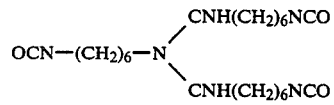

such that the molar ratio of NCO group to OH group in FM-2 is 1/1. Then, they were coated on an acrylic resin substrate using a spin coater into a film of 3μ thickness and kept at 70° C. in an oven to form a cured layer.

Tb/Fe (23/77 in composition ratio (atomic ratio)) was deposited to 1000 Å thickness on the thus cured layer under vacuum of $10^{-3}$ Torr using a magnetron sputtering device manufactured by Nippon Shinku Gijutsu K.K. and further SiO$_2$ was formed thereon as a protection layer to a 1000 Å thickness to prepare a magnetooptic recording disc. When measured by a polar Kerr rotation measuring device, the Kerr rotational angle (θk) was 0.26° which is equivalent to the value in the case where the Tb/Fe layer is formed on the glass substrate.

The thus obtained recording disc maintained the same Kerr rotational angle θk as it was even after 6 months. It was also confirmed by an Auger electron spectrometer that the Tb/Fe layer did not undergo oxidative degradation.

EXAMPLE 2

'Organosiloxane'

In accordance with the formulation as described in Example 1 of Japanese Pat. Laid-Open No. 38863/1982 which shows a process for preparing the GR-coat solution (polyorganosiloxane) manufactured by Daisel Kagaku Kogyo K.K., 27 parts of ethanol (first class grade chemical) and 3 parts of deionized water was mixed, to which 30 parts of solid flakes of hydrolysis condensates of methyl triethoxy silane were added and dissolved completely in about 40 min under vigorous stirring to prepare a 50% solution thereof.

Separately, 23 parts of ethanol (first class grade chemical), 0.45 parts of curing catalyst comprising a phenol salt of 1,8-diazabicyclo(5,4,0)undecene-7, 0.1 parts of anionic surface active agency containing fluoro carbon chain and 17 parts of glacial acetic acid (first class grade chemical) were well mixed in this order to prepare a catalyst solution. The 50% solution and the catalyst solution as described above were mixed to prepare a coating solution containing 30 parts of flakes of methyl triethoxy silane hydrolysis condensate and 3 parts of water (GR—coat solution).

Then, a substrate or a disc made of methyl methacrylate resin sized 300 mm$\phi$ and 1.2 mm thickness was washed sufficiently, immersed in the GR coat solution, pulled up at a speed of 10 mm/min–500 mm/min and then immediately introduced into a hot blow drier adjusted to 70° C. in order to be dried and cured for 5 hours. The thickness of the coat layer was 0.06–4$\mu$. As another method of forming the layer, the same GR coat solution was dropped on a methyl methacrylate resin substrate placed on a spin coater which is driven at a rotational speed of 200–6000 rpm. Soon after then, the coated substrate was placed in a hot blow drier at 70° C. to carry out drying and curing for 5 hours. The thickness of the thus obtained coated membrane was 0.04–3$\mu$.

Tb-Fe (atomic ratio, Tb:Fe=22:78) was formed to a thickness of about 1000 Å on the thus cured layer under vacuum of $5\times10^{-3}$ Torr using a magnetron type sputtering device manufactured by Nippon Shinku Gijutsu K.K. and, further, SiO$_2$ was formed thereon to a thickness of about 1000 Å as the protection layer by using the same device. A cellophane tape (No. 29, 24 mm wideth, manufactured by Nitto Denki Kogyo K.K.) was sticked on the coated surface of the thus obtained magnetooptic recording disc and the bondability or bonding strength was tested with angle of about 45°, to find that no peeling of the coated layers occurred at all. Then, the Kerr rotational angle $\theta$k was measured using the polar Kerr rotation angle measuring device to find that the $\theta$k was 0.25°–0.27° which is the same value as that of the case where the Tb/Fe layer is formed on the glass substrate.

The thus obtained recording disc maintained the same Kerr rortational angle $\theta$k as it was even 6 months after and it was confirmed by the Auger electron spectrometer that there was no oxidative degradation in the Tb/Fe layer.

EXAMPLE 3

'Polyallyl Compound'

According to the method as described in U.S. Pat. No. 3,465,076 (Mitsubishi Rayon), a prepolymer of diethylene glycol bisallyl carbonate was coated and heat cured on a glass plate to prepare a casted film. MMA (methylmethacrylate) monomer was cast on the casted film and then polymerized to prepare a PMMA plate whose surface was covered with the diethylene glycol bisallyl carbonate film (trade name, CR-39). The resulting surface coated PMMA substrate was dried under vacuum at 70° C. for about 40 hours, on which was sputtered a Tb/Fe layer to a thickness of about 1000 Å using the same device as in Example 1 and SiO$_2$ film was further formed thereon to a thickness of 1000 Å as the protection layer.

The Kerr rotational angle $\theta$k of the thus obtained magnetooptic recording disc was 0.23°. Further, no oxidative degradation was observed in the Tb/Fe layer even 6 months after.

EXAMPLE 4

'Polyfunctional Acrylic Compound'

25 parts of DPHA (dipentaerythritol hexaacrylate) manufactured by Nippon Kayaku K.K., 10 parts of P2100 (polyeter acrylate) manufactured by Nippon Kayaku K.K., 5 parts of HX220 (polyesteracrylate) manufactured by Nippon Kayaku K.K., 15 parts of toluene and 55 parts of n-buthanol were mixed to each other. 1.5 parts of initiator Irgacure 651 available from CIBA Co. were admixed as an ultraviolet curing catalyst to prepare a coating solution (here and hereinafter all parts means parts by weight).

A PMMA substrate sized 300 mm$\phi$ and 1.2 mm thickness was washed sufficiently, dried and then set to a spin coater. The coating solution was dropped on the substrate to be uniformly coated thereon under the rotation of 500 rpm–1000 rpm. Then, the substrate was placed at a distance of 10 cm from an ultra high voltage mercury lamp (lamp intensity 80 W/cm) and cured under the irradiation of ultraviolet rays for about 20 sec. The thickness of the coating layer was 0.2$\mu$–1$\mu$.

TbFe (automic composition ratio Tb:Fe=22:78) layer was formed to a thickness of about 1000 Å on the cured coating layer obtained in this way under vacuum of $5\times10^{-3}$ Torr using a magnetron type sputtering device manufactured by Nippon Shinku Gijutsu K.K., and SiO$_2$ was further formed thereon to a thickness of about 1000 Å as the protection layer using the same device.

The bondability of the thus obtained magnetooptic recording disc was tested in the same cellophane tape method as in Example 2. Peeling of the coated layers was observed neither in Example 4 nor Example 5. The Kerr rotational angle $\theta$k was 0.26–0.27 which is the same as that in the case where the Tb/Fe layer is formed on the glass substrate.

The discs in Examples 4 and 5 maintained the same Kerr rotational angle $\theta$k even 6 months after. It was confirmed that no oxidation occurred in the TbFe layer by using the Auger electron spectrometer.

EXAMPLE 5

'Protection Layer'

A second protection layer was formed to a thickness of 0.2$\mu$ (2000 Å) on the SiO$_2$ protection layer of the magnetooptic recording disc obtained in Example 4 using the same coating solution and the same method as in Example 4. The property of the thus obtained disc was substantially the same as that of Example 4.

Although this invention has been described above referring to particular examples, this invention is no way limited only thereto. For example, the polymer layer according to this invention can be formed not only directly to the plastic substrate, but also it may be formed by way of an appropriate primer layer or may be formed after applying surface treatment such as etching to the substrate.

As apparent from the foregoing explanations, the vertical magnetization characteristic can be obtained in a stable manner by putting the polymer layer according to this invention between the plastic substrate and the rare earth-amorphous layer, whereby the plastic substrate which has been distrustful of its use in view of the stability and the reliability can now be used as the magnetooptic recording carrier.

What is claimed is:

1. A magnetooptic recording carrier comprising a transparent plastic substrate; a crosslinked polymer layer having good bondability to the plastic substrate bonded to the plastic substrate, the crosslinked polymer layer being formed from at least one polymer selected from the group consisting of a polyallyl compound, a polyfunctional acrylic compound, a thermosetting resin, a hydrolyzate of an alkyl silicate and an organopolysiloxane; and, on said crosslinked polymer layer, a rare earth-transition metal amorphous layer.

2. The magnetooptic recording carrier as defined in claim 1, in which the transparent plastic substrate is made of an acrylic resin, polycarbonate resin, styrenic resin or polyester resin, and the rare earth-transition metal amorphous layer is formed with material selected from the group consisting of Tb-Fe, Tb-Fe-Co, Dy-Fe, Gd-Tb-Fe, Gd-Tb-Dy-Fe and Gd-Co alloys.

3. The magnetooptic recording carrier as defined in claim 1 or 2, in which the thickness of the crosslinked polymer layer is between $0.01-10\mu$.

4. The magnetooptic recording carrier as defined in claim 3 further comprising, formed on the surface of the rare earth-transition metal amorphous layer on the side opposite the crosslinked polymer layer; a reflection layer or, a dielectric layer or, a reflection layer having a dielectric layer formed on the surface thereof, or a dielectric layer having a reflection layer formed on the surface thereof.

* * * * *